US012045011B2

(12) United States Patent
Di Domenico et al.

(10) Patent No.: US 12,045,011 B2
(45) Date of Patent: Jul. 23, 2024

(54) HOROLOGICAL MOVEMENT COMPRISING AN ESCAPEMENT PROVIDED WITH A MAGNETIC SYSTEM

(71) Applicant: The Swatch Group Research and Development Ltd, Marin (CH)

(72) Inventors: Gianni Di Domenico, Neuchatel (CH); Dominique Lechot, Les Reussilles (CH); Marc Stranczl, Nyon (CH); Benoît Légeret, Ecublens (CH)

(73) Assignee: The Swatch Group Research and Development Ltd, Marin (CH)

( * ) Notice: Subject to any disclaimer, the term of this patent is extended or adjusted under 35 U.S.C. 154(b) by 727 days.

(21) Appl. No.: 17/189,359

(22) Filed: Mar. 2, 2021

(65) Prior Publication Data

US 2021/0294268 A1 Sep. 23, 2021

(30) Foreign Application Priority Data

Mar. 18, 2020 (EP) .................................... 20164020

(51) Int. Cl.
*G04B 15/08* (2006.01)
*G04B 15/14* (2006.01)

(52) U.S. Cl.
CPC ............ *G04B 15/08* (2013.01); *G04B 15/14* (2013.01)

(58) Field of Classification Search
CPC ......... G04B 15/08; G04B 15/14; G04C 5/005
See application file for complete search history.

(56) References Cited

U.S. PATENT DOCUMENTS

2019/0377302 A1* 12/2019 Karapatis ............... G04B 15/06

FOREIGN PATENT DOCUMENTS

CH 711404 A2 * 2/2017 ............ G04B 15/14
CH 715 049 A2 12/2019

(Continued)

OTHER PUBLICATIONS

European Search Report issued Oct. 7, 2020 in European Application 20164020.8 filed Mar. 18, 2020 (with English Translation of Categories of Cited Documents), 3 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A horological movement including a mechanical resonator and a hybrid escapement including an escapement wheel and a pallet assembly with at least one magnetic pallet-stone formed of a magnet and associated with a mechanical banking, the escapement wheel including a periodic magnetised structure defining increasing gradients of magnetic potential energy for the magnetic pallet-stone, and protruding parts associated with the increasing gradients of magnetic potential energy. When the force torque is equal to a nominal force torque or has a value within at least an upper part of a given range of values, one of the protruding parts of the escapement wheel is subjected to at least one shock on the mechanical banking of the pallet assembly after the magnetic pallet-stone has climbed any one of the increasing gradients of magnetic potential energy, thus dissipating at least partially a kinetic energy of the escapement wheel.

13 Claims, 6 Drawing Sheets

(56) References Cited

FOREIGN PATENT DOCUMENTS

| | | | | |
|---|---|---|---|---|
| CN | 104730898 | A | 6/2015 | |
| CN | 106062644 | A | 10/2016 | |
| CN | 110579954 | A | 12/2019 | |
| EP | 2894522 | A2 * | 7/2015 | ............ G04B 15/06 |
| EP | 2 894 522 | A2 | 1/2019 | |
| EP | 2 894 522 | B1 | 1/2019 | |
| WO | WO 2015/097066 | A2 | 7/2015 | |

OTHER PUBLICATIONS

Combined Chinese Office Action and Search Report issued May 16, 2022, in Chinese Patent Application No. 202110291335.3 (with English translation), 15 pages.

* cited by examiner

HOROLOGICAL MOVEMENT COMPRISING AN ESCAPEMENT PROVIDED WITH A MAGNETIC SYSTEM

CROSS-REFERENCE TO RELATED APPLICATION

This application claims priority to European Patent Application No. 20164020.8 filed on Mar. 18, 2020, the entire disclosure of which is hereby incorporated herein by reference.

TECHNICAL FIELD

The invention relates to horological movements comprising an escapement provided with a magnetic system. More specifically, the invention relates to an escapement provided with a magnetic coupling system between an escapement wheel and a pallet assembly separate from the mechanical resonator, this pallet assembly having a different axis of rotation from that of the mechanical resonator. As for a Swiss pallet assembly, the pallet assembly has an alternating movement, which is synchronous with the periodic movement of the mechanical resonator but different. The term magnetic escapement denotes an escapement provided with magnets arranged in part on the pallet assembly and in part on the escapement wheel so as to create a magnetic coupling between the pallet assembly and the escapement wheel.

Technological Background

Various horological movements with a magnetic escapement have previously been proposed in patent applications. As regards magnetic escapements comprising a separate pallet assembly from the mechanical resonator, mention can be made of the document EP 2 894 522 and the document EP 3 208 667. The first document proposes a combination of a magnetic escapement solely carrying out the function of the escapement in the normal operating range of the escapement, when the torque supplied to the escapement wheel is less than a nominal torque, and a mechanical escapement which takes over, carrying out the function of the escapement in addition to the magnetic escapement, when the torque applied to the pallet assembly is greater than the nominal torque, particularly following a shock to which the mechanical movement can be subjected. The second document EP 3 208 667 more specifically describes a magnetic escapement with a pallet assembly coupled mechanically with the mechanical resonator and magnetically with the escapement wheel, the latter having two annular magnetic tracks formed by a planar and continuous magnetised structure, which defines gradients of magnetic potential energy and magnetic barriers for at least one magnetic pallet-stone of the pallet assembly which is arranged to alternately follow segments of the two magnetic tracks, this magnetic pallet-stone being formed by a magnet. With reference to FIG. 20 of this document, it is proposed to arrange additional mechanical bankings between the pallet assembly and the escapement wheel, so as to ensure that the escapement does not unhook in the event of a shock. These additional bankings are disposed so as to block the feed of the escapement wheel when the magnet of a magnetic pallet-stone of the pallet assembly partially passes through a magnetic barrier following a shock.

The two documents mentioned above therefore propose additional mechanical means to the magnetic coupling system between the escapement wheel and the pallet assembly to prevent the escapement wheel from making untimely additional steps in the event of shocks or further significant accelerations sustained by the mechanical movement.

SUMMARY OF THE INVENTION

The inventors detected a specific problem with magnetic escapements, which stems from the fact that the magnetic force is conservative. When a magnetic barrier of the rotary escapement wheel arrives at the banking against a magnetic pallet-stone of the pallet assembly, it is observed that the escapement wheel recoils and then undergoes an oscillation movement which can last for a relatively long time. To ensure constant and efficient behaviour of the magnetic escapement, it is advantageous that, before the pallet assembly is rotated by the mechanical resonator during each alternation thereof, the escapement wheel is substantially stabilised in a stopping position corresponding to a magnetic potential energy determined for a given force torque which is applied to this escapement wheel by a barrel via a gear train of the horological movement.

It is therefore noted that the oscillation movement to which the escapement wheel is subjected, whenever a magnetic barrier abuts against a magnetic pallet-stone of the pallet assembly, limits the operating frequency of the magnetic frequency and therefore the oscillation frequency of the mechanical resonator. This is a drawback because a high oscillation frequency, for example greater than 4 Hz, makes it possible to resist shocks better and also increase the quality factor of the mechanical resonator.

The present invention proposes to offer a solution to this specific problem. For this purpose, the invention relates to a horological movement, as defined in claim 1, which comprises a mechanical resonator and an escapement which is associated with this mechanical resonator, the escapement comprising an escapement wheel and a pallet assembly separate from the mechanical resonator and wherein the axis of rotation is different from that of the mechanical resonator. The mechanical resonator is coupled with the pallet assembly such that, when this mechanical resonator has an oscillation, the pallet assembly is subject to an alternating movement between two rest positions wherein the pallet assembly remains alternately during successive time intervals. The pallet assembly comprises at least one magnetic pallet-stone formed from a magnet and the escapement wheel comprises a periodic magnetised structure which defines a plurality of increasing gradients of magnetic potential energy for said magnetic pallet-stone, each of these increasing gradients of magnetic potential energy being arranged such that said magnetic pallet-stone can climb it when the pallet assembly is in a corresponding rest position of the two rest positions and that a force torque supplied to the escapement wheel corresponds to a normal operation of the horological movement, this force torque being equal to a nominal force torque or within a range of values which is selected for the normal operation of the horological movement. Then, said magnetic pallet-stone and said plurality of increasing gradients of magnetic potential energy are arranged such that the pallet assembly is subject to a magnetic force impulse in the direction of the movement thereof, after said magnetic pallet-stone has climbed any one of said increasing gradients of magnetic potential energy, when the pallet assembly tips from one of the two rest positions enabling this magnetic pallet-stone to climb said any increasing gradient of magnetic potential energy to the other rest position. Furthermore, the pallet assembly comprises at least one mechanical banking and the escapement wheel comprises protruding parts.

Finally, the pallet assembly and the escapement wheel are arranged such that, when said force torque is equal to said nominal force torque or has a value within at least an upper part of said value range and when the pallet assembly exhibits said alternating movement, one of said protruding parts of the escapement wheel is subject to at least one shock on a mechanical banking of said at least one mechanical banking after said magnetic pallet-stone has climbed any one of said increasing gradients of magnetic potential energy following a tipping of the pallet assembly in the rest position enabling this magnetic pallet-stone to climb said any gradient of magnetic potential energy, said at least one shock occurring so as to dissipate at least partially a kinetic energy of the escapement wheel acquired following said tipping.

According to a preferred embodiment, the periodic magnetised structure furthermore defines for the magnetic pallet-stone magnetic barriers located respectively after the increasing gradients of magnetic potential energy, each of these magnetic barriers being arranged so as to exert a magnetic force torque on the escapement wheel, having an opposite direction to that of said force torque supplied to this escapement wheel, when the escapement wheel is in an angular equilibrium position of the forces exerted thereon while the magnetic pallet-stone is located at the top of the magnetic potential energy gradient preceding the magnetic barrier in question, said magnetic force torque being greater than a maximum magnetic force torque induced by the magnetic potential energy gradient preceding the magnetic barrier in question before the escapement wheel reaches said angular equilibrium position of the forces.

Thanks to the features of the invention, the hybrid escapement according to the invention, i.e. of the magnetic and mechanical type, can generate, in normal operation of the horological movement, magnetic force impulses supplied to the pallet assembly in the direction of the movement thereof during when this pallet assembly tips between the two rest positions thereof during the alternating movement thereof, by accumulating magnetic potential energy between at least one magnetic pallet-stone, bearing a magnet, and a periodic magnetised structure, borne by the escapement wheel, allowing the magnetic pallet-stone to successively climb magnetic potential energy gradients, which are formed respectively by portions in the form of an arc of a circle of the periodic magnetised structure coupled successively with the magnetic pallet-stone, while the pallet assembly is in at least one of the two rest positions thereof. Such a magnetic coupling is generally obtained when the magnetic pallet-stone is successively superposed on said portions in the form of an arc of a circle. Furthermore, the not fully elastic shocks, preferably with little or no elasticity, which are provided between protruding parts of the escapement wheel and at least one mechanical banking of the pallet assembly, following each accumulation of magnetic potential energy between the pallet assembly and the escapement wheel, makes it possible to dissipate kinetic energy presented by the escapement wheel, so as to damp at least a first rebound of the escapement wheel and thus enable a relatively rapid stoppage of the escapement wheel, particularly before a subsequent tipping of the pallet assembly.

According to an advantageous alternative embodiment, the escapement is arranged such that, following said shock and before a subsequent tipping of the pallet assembly, the escapement wheel is momentarily immobilised in an angular stopping position which is said angular equilibrium position of the forces.

According to a first case of the advantageous alternative embodiment mentioned above, once the escapement wheel has momentarily stopped in the angular stopping position, the protruding part bears against the mechanical banking in the angular stopping position.

According to a second case of the advantageous alternative embodiment mentioned above, once the escapement wheel has momentarily stopped in the angular stopping position, the protruding part is located at a distance from the mechanical banking in the angular stopping position, the protruding part and the mechanical banking thus not being in contact in this angular stopping position.

BRIEF DESCRIPTION OF THE FIGURES

The invention will be described hereinafter in more detail using the appended drawings, given as non-restrictive examples, wherein.

DETAILED DESCRIPTION OF THE INVENTION

Figure 1A:
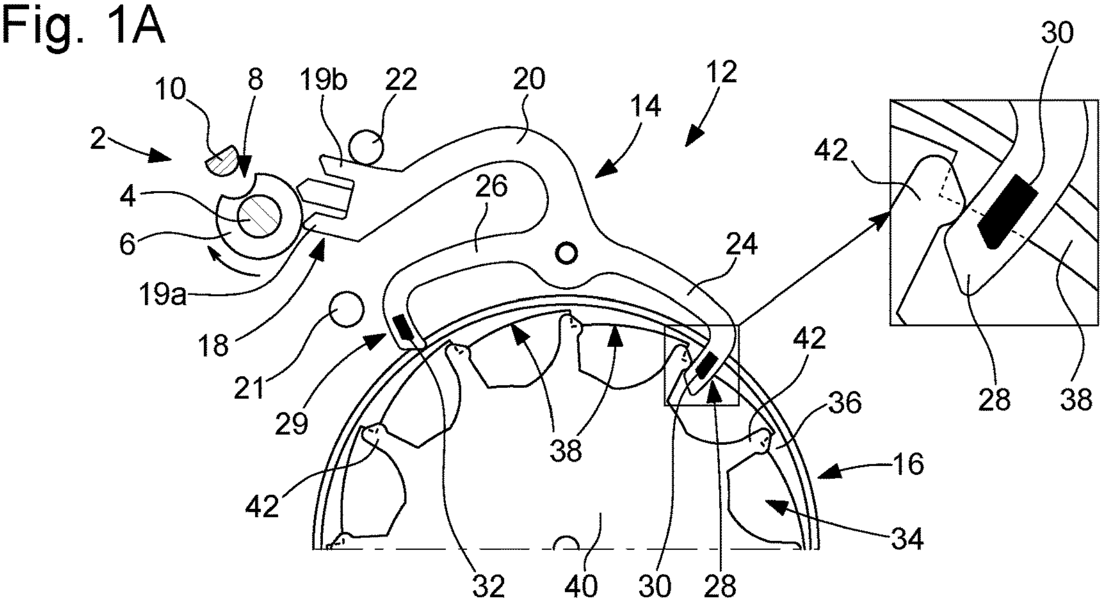
FIGS. 1A to 1F partially show a horological movement according to a first embodiment of the invention with the hybrid escapement thereof in successive positions.

With the aid of FIGS. 1A to 1F, a first embodiment of a horological movement according to the invention will be described hereinafter.

The horological movement is of the mechanical type and comprises a mechanical resonator 2, of which solely the shaft 4, the small plate 6 having a notch 8 and the pin 10 have been shown. The horological movement comprises an escapement 12 which is associated with the mechanical resonator of which the small plate and the pin are elements forming this escapement. The escapement 12 further comprises an escapement wheel 16 and a pallet assembly 14 which is a separate organ from the mechanical resonator and of which the axis of rotation is different from that of this mechanical resonator.

The pallet assembly is formed, on one hand, by a stick 20 ending with a fork 18 which comprises two horns 19*a* and 19*b* and, on the other, by two arms 24, 26 of which the free ends respectively form two mechanical pallet-stones 28, 29 which define two mechanical bankings. The two mechanical pallet-stones respectively support two magnets 30, 32 which form two magnetic pallet-stones of the pallet assembly. Therefore, it can be said that the pallet assembly has hybrid, mechanical and magnetic, pallet-stones, each magnetic pallet-stone being associated with a mechanical pallet-stone. The mechanical resonator is coupled with the pallet assembly such that, when the mechanical resonator oscillates normally, this pallet assembly undergoes an alternating movement, synchronised on the oscillation of the mechanical resonator, between two rest positions, defined by two limiting pins 21 and 22, wherein the pallet assembly remains alternately during successive time intervals which are greater than one third of the nominal period TO of said oscillation.

The escapement wheel 16 comprises a periodic magnetised structure 36 arranged on a disk 34 preferably made of non-magnetic material (not conducting the magnetic fields). The structure 36 has portions 38 in the form of an arc of a circle defining increasing gradients of magnetic potential energy for the two magnetic pallet-stones 30, 32 which each have an axial magnetisation with an opposite polarity to that of the axial magnetisation of the periodic magnetised structure. According to an advantageous alternative embodiment, the periodic magnetised structure 36 is arranged such that the outer rim thereof is circular, the portions 38 in the form of an arc of a circle of this magnetised structure having the same configuration and being arranged circularly around the axis of rotation of the escapement wheel.

As a general rule, each increasing gradient of magnetic potential energy is configured such that each of the two magnetic pallet-stones can climb it when the pallet assembly is in a given rest position of the two rest positions thereof and a force torque $M_{RE}$ supplied to the escapement wheel is substantially equal to a nominal force torque (case of a mechanical movement provided with a constant force system for driving the escapement wheel) or within a range of values selected to ensure the normal operation of the horological movement (case of a conventional mechanical movement having a variable force torque applied to the escapement wheel according to the level of winding of the barrel or barrels if several are arranged in series). The increasing gradients of magnetic potential energy are climbed, when the pallet assembly undergoes an alternating movement between the two rest positions thereof and when the force torque $M_{RE}$ supplied to the escapement wheel is equal to said nominal force torque or within the range of values selected for this force torque in normal operation, successively by each of the first and second magnetic pallet-stones when the pallet assembly is respectively in the first and second rest positions thereof, and alternately by these first and second magnetic pallet-stones during the alternating movement of the pallet assembly. The two magnetic pallet-stones and the increasing gradients of magnetic potential energy are arranged such that the pallet assembly can be subject to a magnetic force impulse in the direction of the movement thereof, after any one of two magnetic pallet-stones has climbed any one of said increasing gradients of magnetic potential energy, when the pallet assembly tips from the rest position corresponding to this any gradient of magnetic potential energy to the other rest position.

The normal operation of a conventional mechanical movement (with no constant force system) is generally obtained, particularly to ensure the operation of the oscillator formed of the mechanical resonator and the escapement, with a force torque $M_{RE}$ supplied to the escapement wheel of which the value is within a certain range of values making it possible to maintain the mechanical resonator at a normal oscillation frequency and count the alternations of this oscillator. However, to obtain an optimal operation with a horological movement having an escapement provided with a magnetic coupling system between the escapement wheel and the pallet assembly, as described above, and to fully benefit from the advantages of such a magnetic coupling system, a hybrid system described hereinafter is provided within the scope of the invention.

The escapement wheel further comprises protruding parts which are associated respectively with the increasing gradients of magnetic potential energy. These protruding parts are formed, in the alternative embodiment shown, by teeth 42 extending radially from a plate 40 rigidly connected to the escapement wheel and located on top of the disk 34 bearing the magnetised structure 36. These teeth are located, superposed, respectively at the end of the magnetised portions 38 which define the increasing gradients of magnetic potential energy, i.e. at the top of these increasing gradients. As disclosed hereinafter, the teeth 42 are arranged to cooperate with the mechanical pallet-stones 28 and 29, which form mechanical bankings for these teeth and therefore for the escapement wheel. The teeth and the mechanical pallet-stones are formed by a non-magnetic material. In a general alternative embodiment, the protruding parts are formed by teeth which extend in a general plane wherein the two mechanical pallet-stones of the pallet assembly respectively supporting the two magnets 30, 32 which are also located in the general plane also extend. The figures only show a lower magnetised structure, located below the general plane mentioned above. However, in an advantageous alternative embodiment, the escapement wheel further comprises an upper magnetised structure, of the same configuration as the lower magnetised structure and supported by an upper disk preferably formed of a non-magnetic structure. The lower and upper magnetised structures together form the periodic magnetised structure. They have the same magnetic polarity, opposite that of the two magnets of the pallet assembly, and are arranged on either side of the geometric plane wherein these two magnets forming the two magnetic pallet-stones are located, preferably at the same distance.

In the case of the first embodiment, the pallet assembly and the escapement wheel are arranged such that, in normal operation (i.e. for a force torque $M_{RE}$ supplied to the escapement wheel substantially equal to a nominal force torque or within a range of values ensuring the normal operation of the horological movement and particularly a correct stepping rotation of the escapement wheel), one of the teeth of the escapement wheel is subject to a shock on one of the two mechanical pallets of the pallet assembly after the corresponding magnetic pallet has climbed any one of the increasing gradients of magnetic potential energy following a tipping of the pallet assembly. This shock occurs so as to dissipate at least partially a kinetic energy of the escapement wheel acquired following said tipping. This shock is therefore not a hard shock (fully elastic shock). In a practical case, at least a first shock is not soft (fully inelastic shock), but it is partially elastic such that the escapement wheel undergoes at least one rebound after this first shock. Thus, the escapement according to the invention is known as a 'hybrid escapement'.

In an advantageous alternative embodiment of the first embodiment, the hybrid escapement is arranged such that the escapement wheel is immobilised momentarily in an angular stopping position after any one of the teeth 42 has abutted against any one of the two mechanical pallet-stones and before a subsequent tipping of the pallet assembly. In normal operation and once the escapement wheel has stopped momentarily in any one angular stopping position of the escapement wheel, a tooth 42 presses against a mechanical stop formed by one or the other of the two mechanical pallet-stones.

To minimise the immobilisation time of the escapement wheel, the shocks are at least partially inelastic such that the pallet assembly and/or the escapement wheel, or the gear train driving it, absorb and dissipate the kinetic energy of this escapement wheel at each shock. It will be noted that the greater the absorption of the kinetic energy during a shock between a tooth and a mechanical pallet-stone, the better the damping of the oscillation occurring after the first shock will be. It will be noted that the magnetic forces are conservative, such that only the frictions exerted on the escapement wheel, or the gear train driving it, and the shocks between a tooth and a mechanical pallet-stone can absorb kinetic energy and therefore an oscillation induced following said first shock after the escapement wheel has stored magnetic potential energy in the hybrid escapement.

To illustrate the operation of the hybrid escapement of the first embodiment, FIGS. 1A to 1F show various successive stages of an oscillating mechanical resonator 2 and a hybrid escapement 12. In FIG. 1A, the pallet assembly 14 is stopped in a first rest position and the balance of the resonator undergoes a rotation in the direction of the neutral position thereof (minimum mechanical potential energy). The magnet 30, forming the first magnetic pallet-stone, is located at the top of an increasing gradient of magnetic potential energy (superposing of the magnet with a part of a magnetised portion 38 having a relatively large width). When the escapement wheel 16 is in an angular stopping position, once the escapement wheel has stopped momentarily, and the pallet assembly in the first rest position thereof, a tooth 42 bears against a mechanical banking formed by the first mechanical pallet-stone 28, this tooth pressing against an internal surface of this first mechanical pallet-stone. Therefore, this creates a situation of equilibrium of the forces exerted on the escapement wheel.

In the advantageous alternative embodiment represented, each magnetised portion 38 has an increasing monotone width and the end part thereof, which has the greatest widths, extends beyond the magnet associated with the mechanical pallet-stone in the positive angular direction (the escapement wheel rotating stepwise in the negative angular direction) while this mechanical pallet-stone presses against a tooth, such that the escapement wheel is subject to a magnetic force of positive direction and therefore a positive magnetic force which decreases, for the force torque supplied to the escapement wheel, the tangential mechanical force exerted by the tooth on the mechanical pallet-stone and therefore the normal force at the contact surface of this magnetic pallet-stone. In particular, the width of the magnetised portions increases, over the entire useful length thereof, linearly according to the angle at the centre. Thus, the accumulation of magnetic potential energy is linear according to the angle of rotation of the escapement wheel for each of the increasing gradients of magnetic potential energy and the magnetic force exerted on the escapement wheel is constant when a magnetic pallet-stone climbs this increasing gradient to an angular stopping position of the escapement wheel wherein one of the teeth thereof bears against the corresponding mechanical pallet-stone, the same constant magnetic force then being exerted on the escapement wheel in this angular stopping position.

Thanks to the features of this advantageous alternative embodiment, the static friction and the dynamic friction between the tooth and the mechanical pallet-stone are reduced, such that the torque required for the subsequent tipping of the pallet assembly is lower. Thus, the magnetic system of the hybrid escapement makes it possible, on one hand, to accumulate magnetic potential energy in the escapement to generate magnetic force impulses applied to the pallet assembly and, on the other, to reduce the unlocking torque to be supplied by the mechanical resonator during each tipping of the pallet assembly. In other words, the reduction in the frictions makes it possible to reduce energy losses due to the mechanical contact between the pallet assembly and the escapement wheel before each tipping of the pallet assembly between the two rest positions thereof.

Figure 1B:
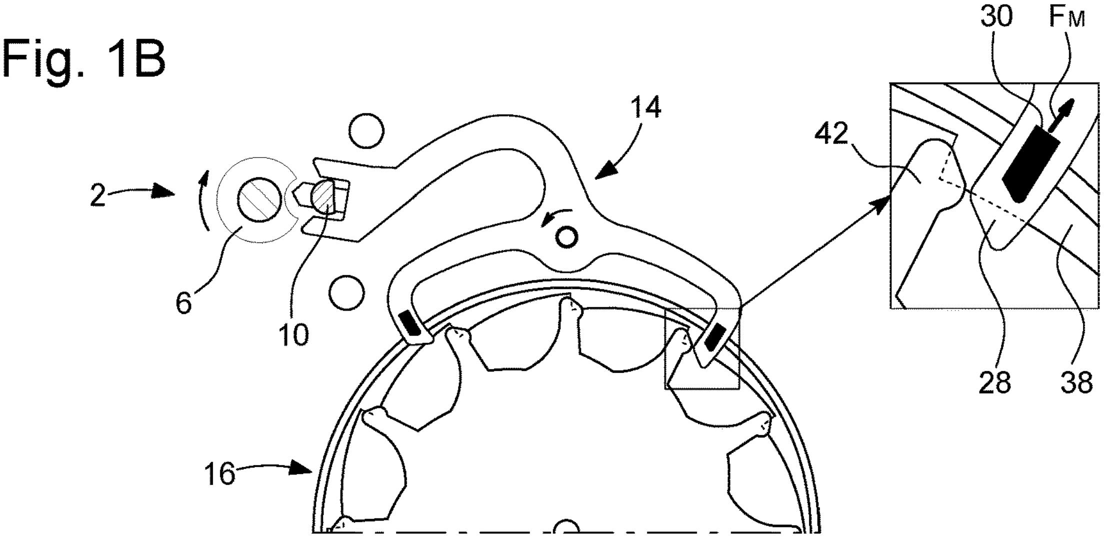
Figure 1C:
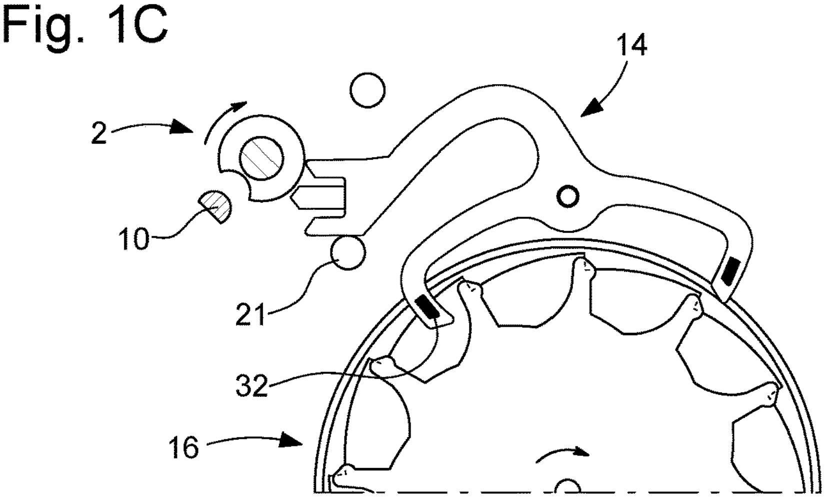
Figure 1D:
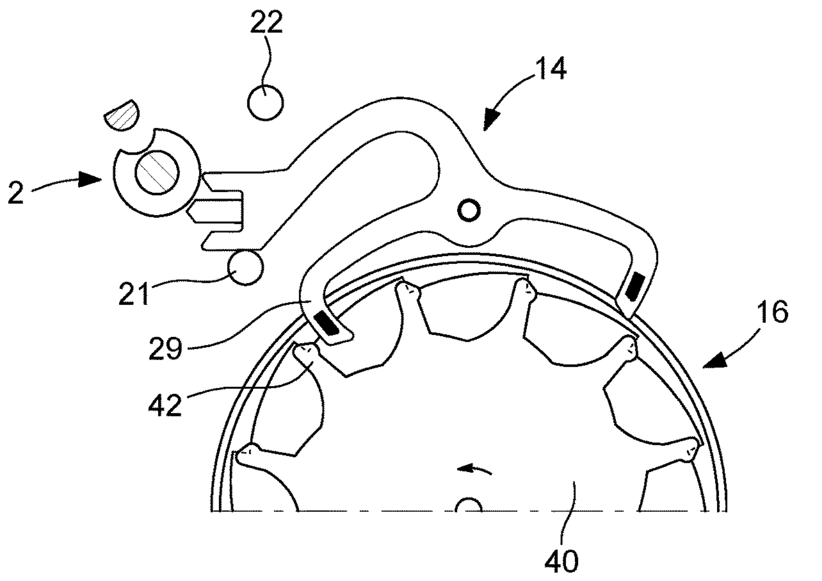
Figure 1E:
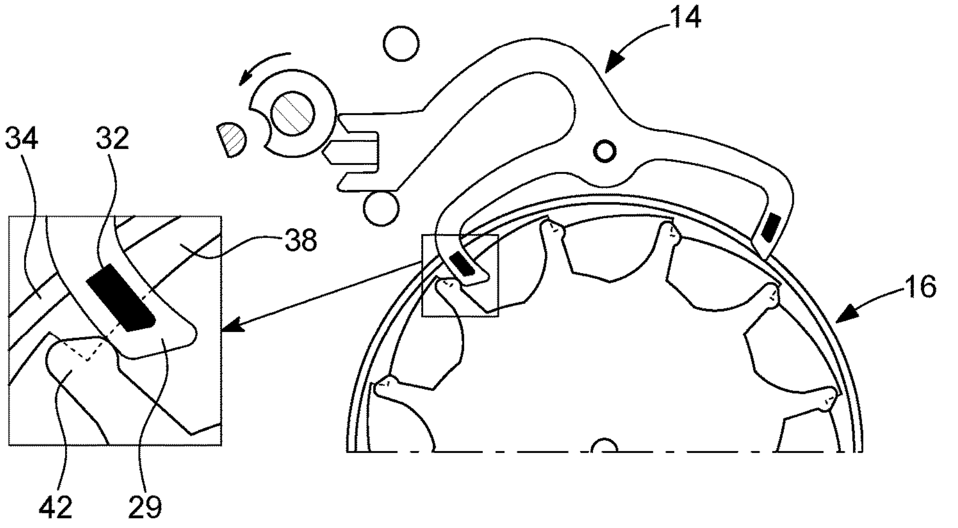
Figure 1F:
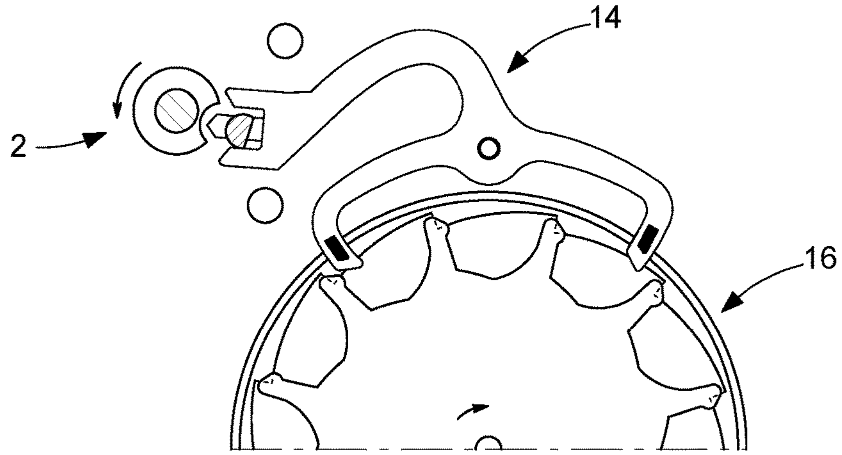

FIG. 1B shows a stage of the operation of the hybrid escapement where the pallet assembly has just been released by the pin 10 from the mechanical resonator 2 and tips between the first position thereof and the second rest position thereof. During this movement of the pallet assembly, the magnet 30 moves radially (with respect to the escapement wheel) and changes from a superposed state on the magnetised portion 38, corresponding to a high magnetic potential energy state, to a non-superposed state on this magnetised portion corresponding to a low magnetic potential energy state; which generates a magnetic force impulse applied to the magnetic pallet-stone (magnet 30) and thus the pallet assembly is subject to a magnetic force torque, such that the pallet assembly acts as a driver for the magnetic resonator. FIG. 1C shows the pallet assembly in the second rest position thereof just after a tipping. The escapement wheel 16 then rotates by one step in the negative direction and the magnet 32 climbs an increasing gradient of magnetic potential energy thanks to the force torque supplied to the escapement wheel. FIG. 1D shows a rebound of the escapement wheel after a first shock of a tooth 42 on the mechanical pallet-stone 29 while the mechanical resonator is in an angular position close to the amplitude thereof. FIG. 1E shows a stage corresponding to that of FIG. 1A but for the pallet assembly stopped in the second rest position thereof. In the angular stopping position of the escapement wheel represented in FIG. 1E, a tooth 42 presses against an outer surface of the second mechanical pallet-stone 29. Finally, FIG. 1F shows a coupling between the mechanical resonator and the pallet assembly during which a magnetic force impulse occurs again, as in FIG. 1B but applied to the second pallet-stone such that the resulting magnetic force torque is of the opposite direction to that of this FIG. 1B.

Figure 2A:
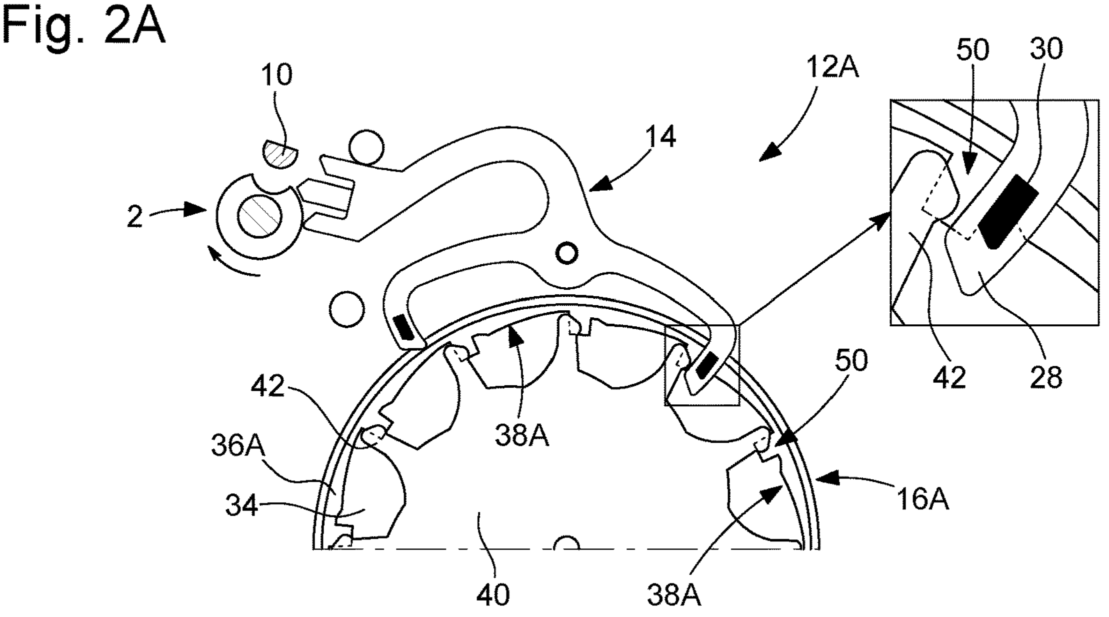
FIGS. 2A to 2F partially show a horological movement according to a second embodiment of the invention with the hybrid escapement in successive positions.
Figure 2B:
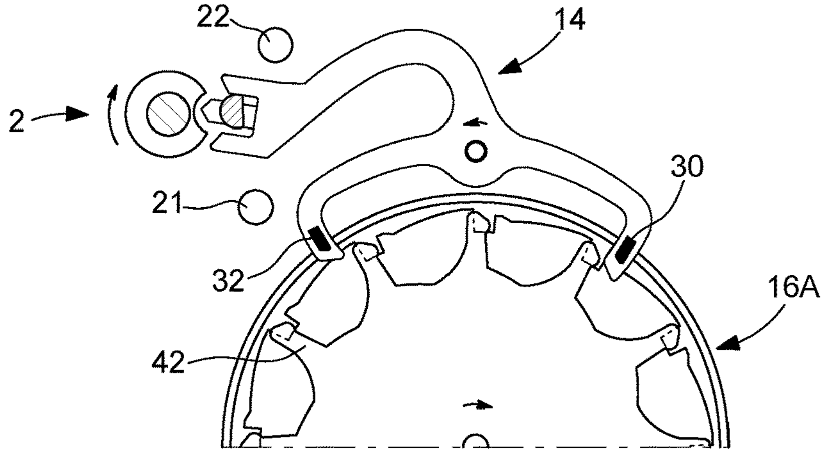
Figure 2C:
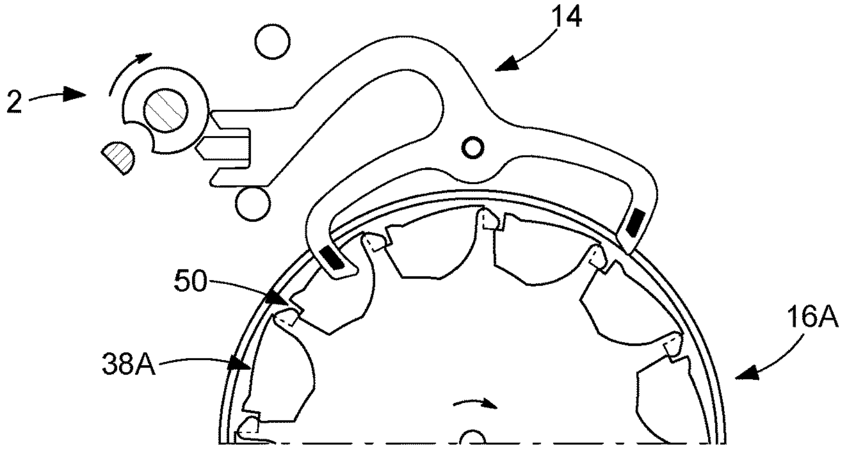
Figure 2D:
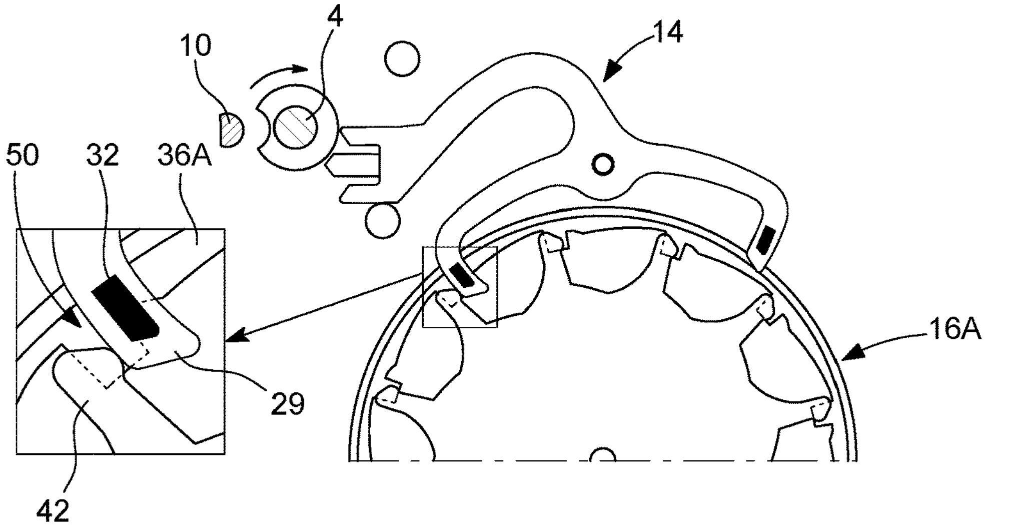
Figure 2E:
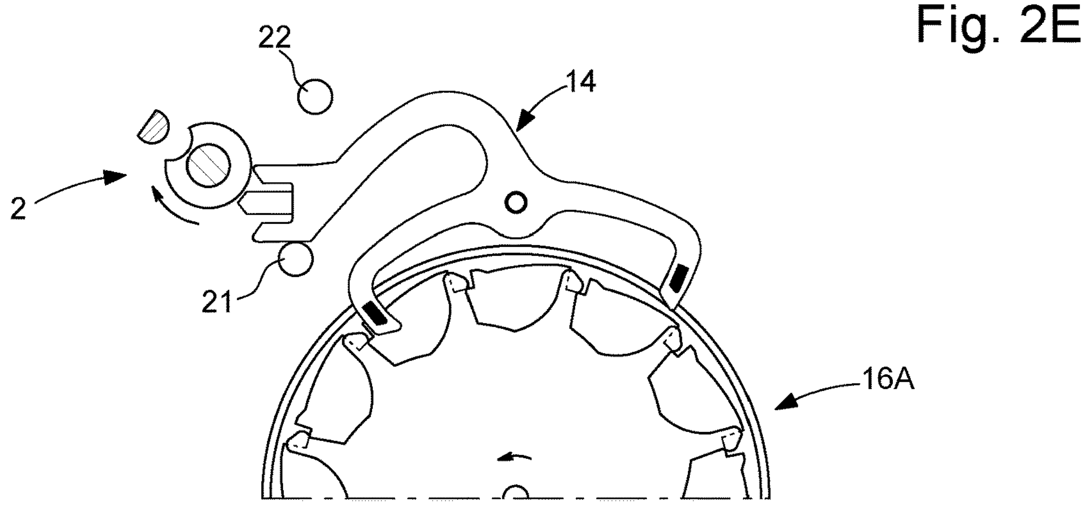
Figure 2F:
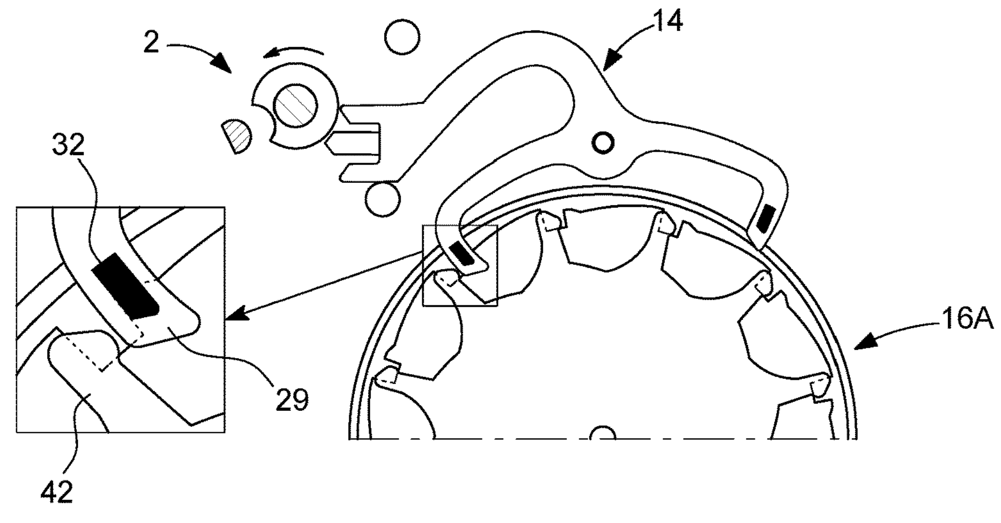
Figure 3:
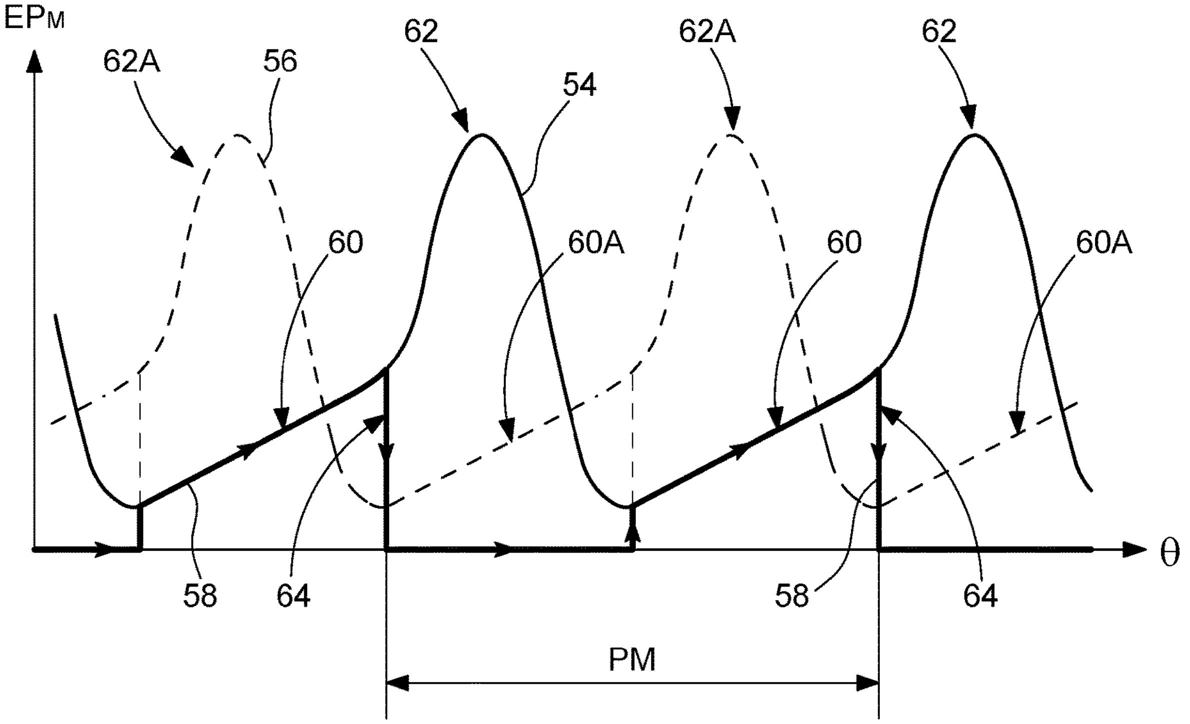
FIG. 3 represents, for a horological movement provided with an escapement having a magnetic system of the type of the second embodiment but produced with no mechanical banking according to the prior art, a magnetic potential energy curve for each of the two rest positions of the pallet assembly according to the angle of this escapement wheel, as well as a simplified tracing of the magnetic potential energy of a magnetic pallet-stone of the pallet assembly according to the angle of the escapement wheel during normal operation of the horological movement.
Figure 4:
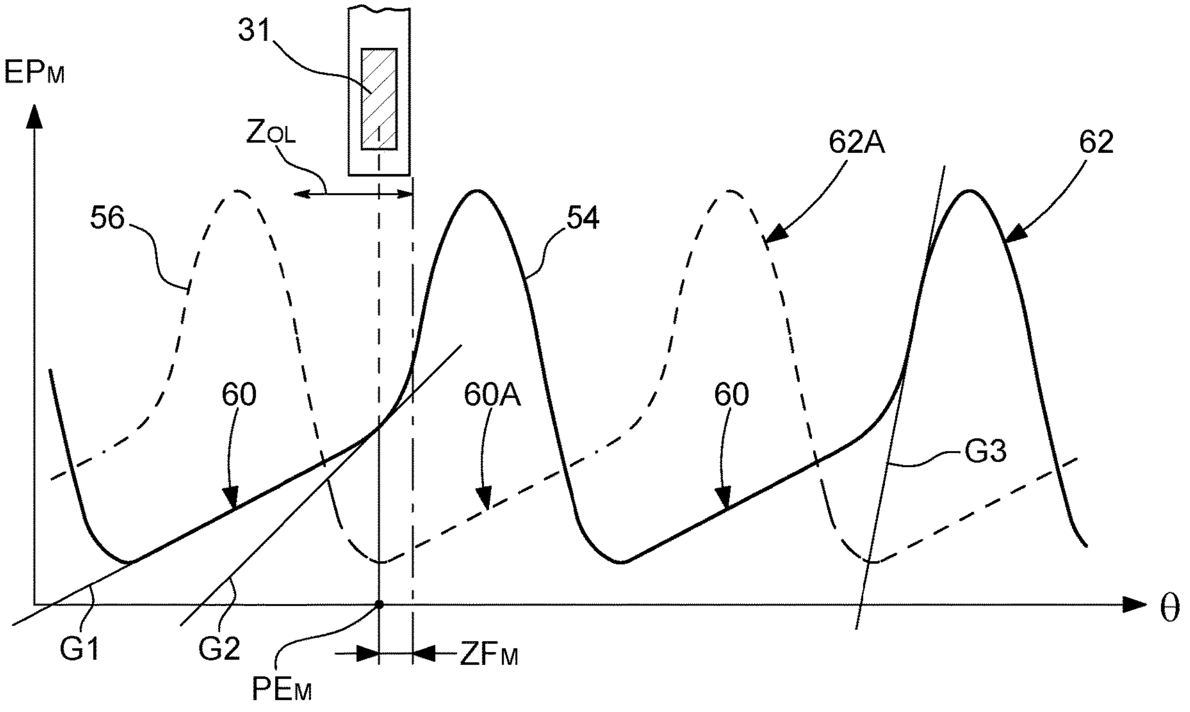
FIG. 4 represents, for the horological movement of FIG. 3, the precise behaviour of the escapement wheel after a magnetic pallet-stone of the pallet assembly has climbed a magnetic potential energy gradient defined by the periodic magnetised structure.

With the aid of FIGS. 2A to 2F and 3 to 6, various alternative embodiments of a second embodiment of a horological movement according to the invention will now be described (note that FIGS. 3 and 4 are given for the purposes of explanation, but do not concern alternative embodiments of the invention). The references already described above will be not be described again in detail.

The second embodiment generally differs from the first embodiment in that the periodic magnetised structure 36A furthermore defines for each of the two magnetic pallet-stones magnetic barriers 50 located respectively after the increasing gradients of magnetic potential energy defined by the magnetised portions 38A, these magnetic barriers being formed particularly by magnetic areas 50 of the structure 36A wherein the radial dimension is substantially equal to or greater than the longitudinal dimension of each of the two magnets 30 and 32 forming the magnetic pallet-stones of the pallet assembly. Each magnetised area/magnetic barrier is arranged so as to exert a magnetic force torque on the escapement wheel 16A, having an opposite direction to that of said force torque supplied to this escapement wheel, when this escapement wheel is in an angular equilibrium position of the forces exerted thereon while one or the other of the two magnetic pallets is located at the top of the magnetic potential energy gradient/at the widest end of the magnetised portion 38A preceding the magnetic barrier/the magnetised area 50 in question. The arrangement of the magnetic barriers is configured such that the magnetic force torque exerted on the escapement wheel in each angular equilibrium position of the forces is greater than a maximum magnetic force torque generated by the magnetic potential energy gradient/the magnetised portion 38A preceding the magnetic barrier in question before the escapement wheel reaches the angular equilibrium position of the forces.

Before describing various alternative embodiments of the second embodiment in more detail, with the aid of FIGS. 3 and 4, the operation of a horological movement provided with a magnetic escapement having a magnetic system of the type of the second embodiment but produced with no mechanical banking will be described. The term 'type of the second embodiment' particularly denotes an escapement provided with a magnetic system which comprises, on one hand, a periodic magnetised structure which is borne by the escapement wheel and having, in a lower plane and/or an upper plane, a single circular magnetic track formed by a succession of similar magnetised portions (in a reference system "r, θ" where r=radius and θ=angle at the centre of the wheel) separated by magnetised areas and, on the other, two magnetic pallet-stones borne by the pallet assembly which are alternately coupled with the periodic magnetised structure. As the escapement concerned by FIGS. 3 and 4 is merely magnetic, the magnetised areas must form relatively large magnetic barriers to ensure the desired synchronisation between the alternating movement of the pallet assembly and the stepping rotation of the escapement wheel and also to prevent the escapement from unhooking too quickly in the event of accelerations to which the horological movement could be subjected. Thus, the magnetic potential energy peaks formed here by the magnetised areas for each magnetic pallet-stone are greater than those which are required in the second embodiment of the invention and which appear in FIGS. 5 and 6, which will be described hereinafter.

In FIGS. 3 and 4, for each of the two rest positions of the pallet assembly, a curve 54, 56 of magnetic potential energy $EP_M$, defined by the periodic magnetised structure of the escapement wheel for each of the two magnetic pallet-stones of the pallet assembly, according to the angle θ of this escapement wheel is given. The two curves 54 and 56 are similar, but dephased by about 180° and they each define a magnetic period PM. Each curve has increasing gradients of magnetic potential energy 60, 60A and magnetic barriers 62, 62A each defined by a magnetic potential energy peak. In FIG. 3, a simplified tracing 58 of the magnetic potential energy $EP_M$ of a magnetic pallet-stone (30 or 32) of the pallet assembly (14) according to the angle θ of the escapement wheel, during a normal operation of the horological movement, is shown. The general behaviour is as follows: In a first rest position of the pallet assembly, a first magnetic pallet climbs a gradient 60 to a certain magnetic potential energy height while the escapement wheel rotates continuously, then the escapement wheel is subject to an oscillation in a 'free' oscillation zone $ZO_L$ around a certain point of equilibrium of the forces $PE_M$ (shown more specifically in FIG. 4) due to the magnetic barrier following each gradient, and finally the first magnetic pallet-stone undergoes, under the action of the oscillating mechanical resonator, a drop in magnetic potential energy 64 during the subsequent tipping of the pallet assembly in the second rest position thereof. This drop in magnetic potential energy corresponds to a magnetic force impulse applied to the pallet assembly. During the next step, while the first magnetic pallet-stone is outside the magnetic structure (superposed) and then has a substantially zero magnetic potential energy, the second magnetic pallet-stone in turn climbs a gradient 60A due to the fact that it is superposed on the magnetic structure. During the subsequent tipping of the pallet assembly, the second magnetic pallet-stone is subject to a magnetic force impulse and the first magnetic pallet-stone climbs, where applicable, a small rate of magnetic potential energy. Thus, the energy transmitted to the pallet assembly at each step of the escapement wheel corresponds to the difference between the drop and the rate undergone alternately by each of the two magnetic pallet-stones, the energy transmitted per magnetic period PM corresponding to double this difference.

FIG. 4 shows which magnetic forces generated by a magnetic pallet-stone on the periodic magnetised structure of the escapement wheel according to the angular position of this wheel. The magnetic forces present are given by the gradients of the magnetic potential energy curve 54. Thus, each gradient 60, 60A generates a magnetic force G1 corresponding to a magnetic force torque on the escapement wheel having an intensity less than the force torque supplied to the escapement wheel when this force torque is equal to the nominal force torque or within the range of values selected in normal operation. It will be noted that in an alternative embodiment where the two magnetic pallet-stones are coupled simultaneously and alternately with two magnetic tracks during the accumulation of magnetic potential energy, it is double the magnetic force torque mentioned above which is to be taken into consideration. In the absence of mechanical bankings, as shown in FIG. 4, each magnetic barrier 62, 62A brakes the escapement wheel in an angular magnetic braking zone $ZF_M$ which is dependent on the force torque supplied to the escapement wheel. As the magnetic force is conservative, the kinetic energy of the escapement wheel can only be dissipated by the frictions in the bearing-blocks of the escapement wheel and optionally in the gear train driving it. Thus, the escapement wheel undergoes a 'free' oscillation in an angular 'free' oscillation zone $ZO_L$ (i.e. without absorption of energy by a mechanical banking) around a point of equilibrium of the forces $PE_M$ where the force torque supplied to the escapement wheel is compensated by the magnetic force torque (without considering the friction forces) which is generated by the magnetic force G2 (gradient of the curve 54 at the angular position $PE_M$). The point of equilibrium of the forces $PE_M$ therefore corresponds to a determined angular position of the escapement wheel wherein it can be stopped in a stable manner without contact between this escapement wheel and the pallet assembly. The point of equilibrium of the forces $PE_M$ and the angular 'free' oscillation zone $ZO_L$ vary according to the force torque supplied to the escapement wheel. The intensity of the magnetic force G2 is necessarily greater than the magnetic force G1. It will furthermore be noted that each magnetic barrier, in the embodiment described in FIGS. 3 and 4, corresponds in the curves 54 and 56 to a potential energy peak having a wall with a relatively high slope G3.

The magnetic escapement described with reference to FIGS. 3 and 4 exhibits a functional problem due to the oscillation of the escapement wheel after a magnetic potential energy gradient has been climbed by a magnetic pallet-stone. As disclosed, there is little dissipation of the kinetic energy of the escapement wheel (arising from the difference in intensity between G1 and G2) arriving against a magnetic barrier, such that this oscillation has an amplitude that can be relatively large and low damping. On other hand, if a tipping of the pallet assembly occurs while the escapement wheel is still oscillating, the drop in magnetic potential energy 64 is variable and therefore poorly defined. There is thus no constant maintenance of the mechanical resonator, which is a disadvantage. On the other, if it is essential to wait for the oscillation of the escapement wheel to be sufficiently damped to be negligible, then the frequency of the alternating movement of the pallet assembly must be limited and therefore also the oscillation frequency of the mechanical resonator. This is also a disadvantage. The hybrid escapement according to the invention solves this problem.

The arrangement of magnetic barriers 50 in combination with the teeth 42 of the escapement wheel in the second embodiment of invention has the effect that various alternative embodiments can arise for a given hybrid pallet assembly, with the mechanical pallet-stones and magnetic pallet-stones thereof, according to the relative angular positioning between each tooth and the corresponding magnetic barrier and also according to the type of drive of the escapement wheel.

Figure 5:
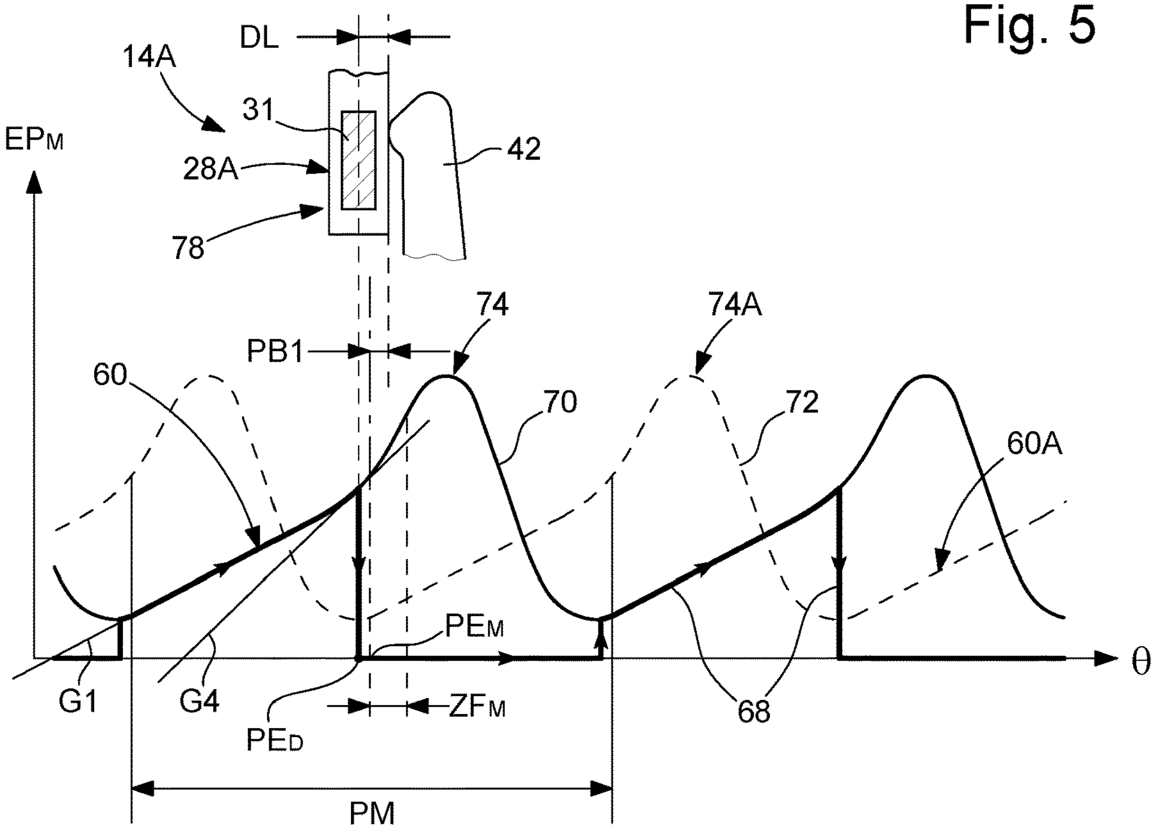
FIG. 5 shows schematically, for a horological movement according to the second embodiment of the invention, a first alternative embodiment of arrangement and of operation of the hybrid escapement thereof using a curve of the magnetic potential energy accumulated by a magnetic pallet-stone of the pallet assembly according to the angle of the escapement wheel.
Figure 6:
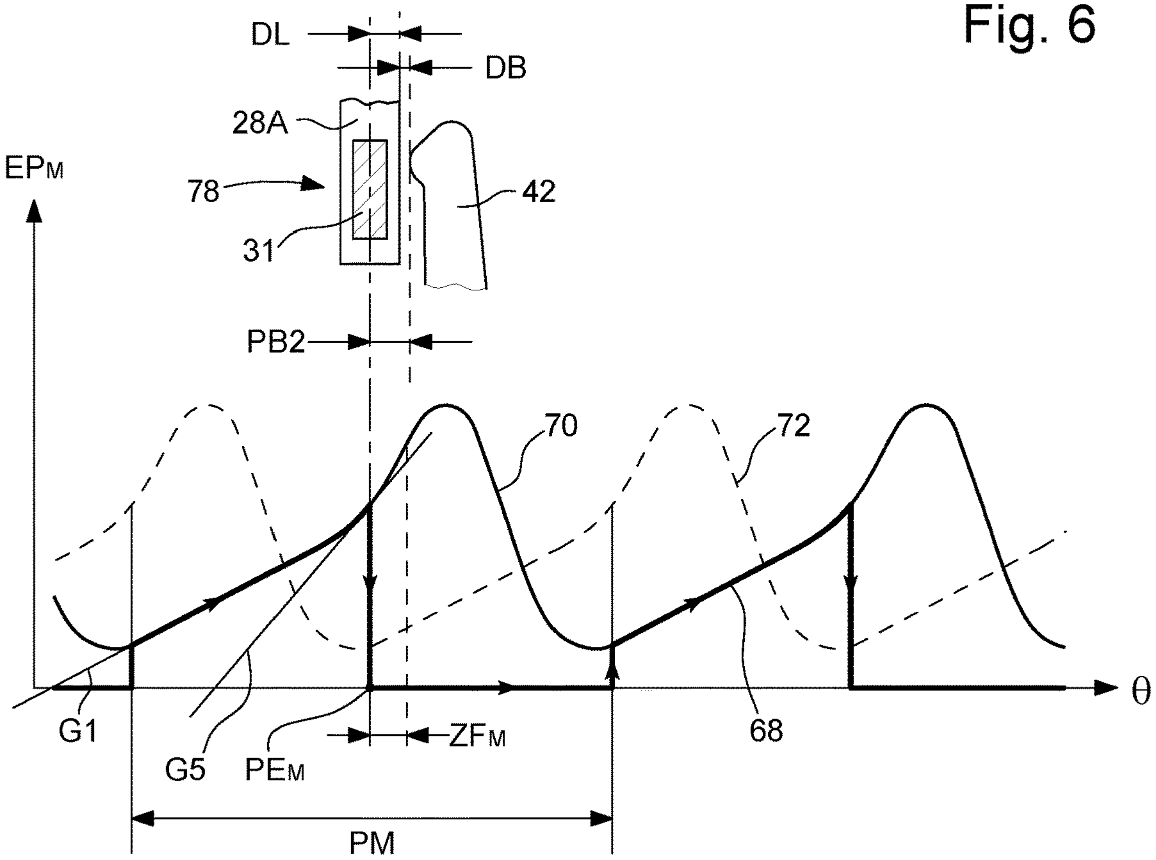
FIG. 6 shows schematically, for a horological movement according to the second embodiment of the invention, a second alternative embodiment of arrangement and of operation of the hybrid escapement thereof using a curve of the magnetic potential energy accumulated by a magnetic pallet-stone of the pallet assembly according to the angle of the escapement wheel.

With reference to FIGS. 5 and 6, two possible alternative embodiments for a horological movement will be described, according to the second embodiment of the invention, provided with a drive system of the escapement wheel at constant force Fc, the force torque $M_{RE}^{ct}$ supplied to the escapement wheel being also constant. FIGS. 5 and 6 represent two curves 70 and 72 of magnetic potential energy $EP_M$ defined by the periodic magnetised structure 36A of the escapement wheel 16A respectively for two hybrid pallet-stones of a hybrid pallet assembly 14A, which is similar to the pallet assembly 14 represented in FIG. 2A but with two hybrid pallet-stones having a simplified and symmetrical shape. The curves 70, 72 are general, slightly schematic, curves to simplify the drawing without impeding the physical principles disclosed and mathematical relations given hereinafter. These curves each define, for each magnetic period PM, increasing gradients 60, 60A with a characteristic gradient G1, similar to those described with reference to FIGS. 3 and 4, and lower magnetic barriers 74, 74A than the magnetic barriers 62, 62A defined by a periodic magnetised structure provided without the protruding stopping parts. The magnetised areas forming the magnetic barriers 74, 74A can thus be less wide angularly; which particularly makes it possible to increase the number of steps per revolution for the escapement wheel. The tracing 68 of the magnetic potential energy $EP_M$ of the magnetic pallet-stone 31 according to the angle θ of the escapement wheel, during a normal operation of the hybrid escapement, is also shown in FIGS. 5 and 6. It can be seen that it is similar to the simplified tracing 58 of FIG. 3.

A hybrid pallet-stone, which is formed of a mechanical pallet 28A supporting a magnet 31 which defines a magnetic pallet-stone associated with the curve 70, is represented along the axis of the angular position θ of the escapement wheel while the latter is in a stopping position, after absorption of the kinetic energy thereof following an accumulation of magnetic potential energy and before a subsequent tipping of the pallet assembly. The mechanical pallet-stone 28A has a half-width DL which corresponds to the distance between the centre of mass of the magnet 31 and the banking surface defined by this mechanical pallet-stone for the teeth 42 of the escapement wheel 16A.

The two alternative embodiments described within the scope of a general embodiment of the invention wherein the hybrid escapement is arranged such that, following a shock of a mechanical pallet-stone against any one of the protruding parts of the escapement wheel and before a subsequent tipping of the pallet assembly, the escapement wheel is immobilised in an angular stopping position which is an angular position of equilibrium of the forces present. In FIGS. 5 and 6, the angular position of equilibrium of the forces $PE_M$, in the (imaginary) absence of stopping teeth on the escapement wheel, and the magnetic braking zone $ZF_M$ which would occur in the imaginary case without the teeth 42 are indicated, as disclosed with reference to FIGS. 3 and 4.

In the first alternative embodiment represented in FIG. 5 and also in the second alternative embodiment represented in FIG. 6, the pallet assembly 14A and the escapement wheel 16A are arranged such that one of the teeth 42 of the escapement wheel is subject to a shock on a mechanical pallet-stone of the pallet assembly, particularly the mechanical pallet-stone 28A, after the corresponding magnetic pallet-stone, particularly the magnet 31, has climbed any one of the increasing gradients of magnetic potential energy, particularly a gradient 60. As in the first embodiment, this shock occurs so as to dissipate at least partially a kinetic energy of the escapement wheel. Indeed, the teeth of the escapement wheel are arranged to absorb kinetic energy from this escapement wheel, after an accumulation of magnetic potential energy in the escapement for a subsequent maintenance impulse of the mechanical resonator, and limit a terminal oscillation during each step of the stepping rotation thereof.

Furthermore, in the first alternative embodiment of FIG. 5, the pallet assembly 14A and the escapement wheel 16A are arranged such that, after at least a first shock between a mechanical pallet-stone and a tooth, the escapement wheel stops, before the pallet assembly tips again during the alternating movement thereof between the two rest positions thereof, at an angular stopping position, which is by definition an angular position of equilibrium of the forces, wherein the tooth 42 subjected to said shock presses against the magnetic pallet-stone. Thus, in this first alternative embodiment, the angular stopping position $PE_D$ is defined by a tooth bearing against a mechanical pallet-stone. Thanks to this feature, the angular stopping positions are specifically defined by the protruding parts and the magnetic force impulses which are supplied periodically to the pallet assembly have a constant intensity. On the other hand, this first alternative embodiment generates a slight energy loss due to the friction between the tooth and the mechanical pallet-stone during the tipping of the pallet assembly. The angular stopping position $PE_D$ is upstream from the angular position $PE_M$. The magnetic force in each position $PE_D$, which corresponds to an equilibrium of the forces present, is given by the gradient G4 of the curve 70, respectively 72, at this position $PE_D$. The situation corresponding to the first alternative embodiment is characterised by a distance PB1 between the angular position $PE_M$ and the point of contact of the tooth 42 which is less than the half-width DL of the mechanical pallet-stone 28A ($PB1<DL$).

The second alternative embodiment differs from the first alternative embodiment in that the angular stopping position is the angular position $PE_M$, given that, in this second alternative embodiment, the pallet assembly 14A and the escapement wheel 16A are arranged such that, after at least a first shock between a mechanical pallet and a tooth, the escapement wheel stops, before the pallet assembly tips once again during the alternating movement thereof between the two rest positions thereof, at an angular stopping position wherein said tooth is located at a distance from said mechanical pallet-stone, this angular stopping position then corresponding to the angular position $PE_M$ of equilibrium of the forces with no mechanical banking described above, wherein the magnetic force torque of the magnetic system of the escapement and the constant force torque $M_{RE}^{ct}$ supplied to the escapement wheel have the same intensity (disregarding the frictional forces). For said first shock according to the invention to take place, the pallet assembly and the escapement wheel are arranged such that the distance DB between the contact surface of said mechanical pallet-stone and the point of contact of said tooth is less than an angular distance defined by the magnetic braking zone $ZF_M$ ($DB<ZF_M$). The magnetic force in each angular position $PE_M$, which corresponds to an angular stopping position for the escapement wheel, is given by the gradient G5 of the curve 70, respectively 72, at this position $PE_M$. It will be noted that the value of the gradient G5 is necessarily greater than that of the gradient G4 occurring in the first alternative embodiment. The situation corresponding to the second alternative embodiment is characterised by a distance PB2 between the angular position $PE_M$ and the point of contact of the tooth 42 which is greater than the half-width DL of the mechanical pallet-stone 28A (PB2>DL). It will be noted that the angular position $PE_M$ is determined by the constant force torque $M_{RE}^{ct}$.

In the case of a conventional drive of the escapement wheel, i.e. with no constant force system, a greater number of alternative embodiments can be distinguished. To disclose them analytically, a general case is considered where, in normal operation of the horological movement in question, the range of values $PV_M$ for the force torque $M_{RE}$ supplied to the escapement wheel extends between a minimum value $M_{RE}^{min}$ and a maximum value $M_{RE}^{max}$ greater than the minimum value: $PV_M=[M_{RE}^{min}; M_{RE}^{max}]$. The range of values $PV_M$ is composed of a lower part $PI1_M$ and an upper part $PS1_M$ or, alternatively, of a lower part $PI2_M$ and an upper part $PS2_M$. Furthermore, the upper part $PS2_M$ is composed of an upper zone $ZS_{PS}$ and a lower zone $ZI_{PS}$ ($PS2_M=ZI_{PS}+ZS_{PS}$), the complementary part $PC_M$ to the upper zone $ZS_{PS}$ in the range of values $PV_M$ ($PV_M=PC_M+ZS_{PS}$) being equal to the lower zone $ZI_{PS}$ added to the lower part $PI2_M$ ($PC_M=PI2_M+ZI_{PS}$). The distance between the contact surface of the mechanical pallet-stone in question and the point of contact of the tooth in question is known as 'DB', this distance being dependent on the force torque $M_{RE}$. The magnetic braking zone, in the imaginary absence of stopping teeth on the escapement wheel, is named '$ZF_M$', the extent of this zone being dependent on the force torque $M_{RE}$.

In a main alternative embodiment, for the entire range of values $PV_M$ of the force torque $M_{RE}$ at least a first shock occurs between any one of the teeth 42 of the escapement wheel and any one mechanical pallet-stone of the pallet assembly, particularly the mechanical pallet-stone 28A, after the corresponding magnetic pallet-stone has climbed one of the increasing gradients of magnetic potential energy associated with this corresponding magnetic pallet-stone and with the tooth in question. This first main alternative embodiment is expressed by the relation: $ZF_M(M_{RE}^{min})>PB(M_{RE}^{min})-DL$.

Three alternative embodiments can be distinguished within the scope of the main alternative embodiment. In a first secondary alternative embodiment, it is envisaged for the entire range of values $PV_M$ of the force torque $M_{RE}$ that the escapement wheel stops, after said at least a first shock and before a subsequent tipping of the pallet assembly, at an angular stopping position wherein the tooth subject to said at least a first shock presses against the mechanical pallet-stone. This first secondary alternative embodiment is expressed by the mathematical relation: $PB(M_{RE}^{min})<DL$. In a second secondary alternative embodiment, it is envisaged for the entire range of values $PV_M$ of the force torque $M_{RE}$ that the escapement wheel stops, after said at least a first shock and before a subsequent tipping of the pallet assembly, at an angular stopping position wherein the tooth subject to said at least a first shock is located at a distance from the mechanical pallet-stone against which it has abutted. This second secondary alternative embodiment is expressed by the mathematical relation: $PB(M_{RE}\ max)>DL$. A composite alternative embodiment can be furthermore distinguished within the scope of the main alternative embodiment. In this composite alternative embodiment, for a lower part Rim of the range of values $PV_M$, the tooth subject to said at least a first shock is located at a distance from the mechanical pallet-stone against which it has abutted when the escapement wheel is momentarily immobilised. On the other hand, for an upper part $PS1_M$ of the range of values $PV_M$, the tooth subject to said at least a first shock presses against the mechanical pallet-stone against which it has abutted when the escapement wheel is momentarily immobilised. This composite alternative embodiment can be expressed by the two following relations: $PB(PI1_M)>DL$; $PB(PS1_M)<DL$.

In a specific alternative embodiment, merely for an upper part $PS2_M$ of the range of values $PV_M$ of the force torque $M_{RE}$ at least one shock occurs between any one of the teeth 42 of the escapement wheel and any one mechanical pallet-stone of the pallet assembly, particularly the mechanical pallet-stone 28A, after the corresponding magnetic pallet-stone has climbed one of the increasing gradients of magnetic potential energy associated with this corresponding magnetic pallet-stone and with the tooth in question. On the other hand, for a lower part $PI2_M$ of the range of values $PV_M$ of the force torque $M_{RE}$, no shock occurs between one of the teeth 42 of the escapement wheel and a mechanical pallet-stone of the pallet assembly after the corresponding magnetic pallet-stone has climbed one of the increasing gradients of magnetic potential energy associated with this corresponding magnetic pallet-stone. This specific alternative embodiment can be expressed by the two following relations: $ZF_M(PS2_M)>PB(PS2_M)-DL$ et $ZF_M(PI2_M)<PB(PI2_M)-DL$.

Two alternative embodiments can further be distinguished within the scope of the specific alternative embodiment disclosed above. In a specific alternative embodiment, it is envisaged for the entire range of values $PV_M$ of the force torque $M_{RE}$ that the escapement wheel stops, after said at least one shock and before a subsequent tipping of the pallet assembly, at an angular stopping position wherein the tooth subject to at least a first shock is located at a distance from the mechanical pallet-stone against which it has abutted. This specific alternative embodiment is expressed, as for the second secondary alternative embodiment within the scope of the first main alternative embodiment, by the relation: $PB(M_{RE}^{max})>DL$. In a composite alternative embodiment envisaged within the scope of the specific alternative embodiment in question, the tooth subject to said at least one shock presses, once momentarily stopped in the angular stopping position, against the mechanical pallet-stone against which it has abutted when the force torque $M_{RE}$ supplied to the escapement wheel has a value in an upper zone $ZS_{PS}$ of said upper part $PS2_M$ of the range of values $PV_M$. On the other hand, in the lower zone $ZI_{PS}$ of the upper part $PS2_M$, the escapement wheel stops, after said at least one shock and before a subsequent tipping of the pallet assembly, at an angular stopping position wherein the tooth subject to said at least one shock is located at a distance from the mechanical pallet-stone against which it has abutted. Thus, for the complementary part $PC_M$ to the upper zone $ZS_{PS}$ in the range of values $PV_M$, no tooth is abutted against a mechanical pallet-stone in the angular stopping position. This composite alternative embodiment can be expressed by the two following relations: $PB(PC_M)>DL$; $PB(ZS_{PS})<DL$.

FIG. 2A shows a stage of the operation of the hybrid escapement 12A of the second embodiment where the pallet assembly 14 is in one of the two rest positions thereof and the escapement wheel 16A is stopped. FIGS. 2A to 2F relates to an alternative operation wherein the force torque supplied to the escapement wheel does not allow a tooth 42 to bear against a mechanical pallet-stone 28 or 29 when it is stopped after having accumulated magnetic potential energy, by climbing a magnetic potential energy gradient, and before a subsequent tipping of the pallet assembly. However, the distance between the point of contact of the tooth 42 and the contact surface of the mechanical pallet-stone 28 in FIG. 2A, respectively 29 in FIG. 2F is advantageously small.

In FIG. 2B, the pallet assembly has just been released by the pin 10 from the mechanical resonator 2 and it tips between the first position thereof and the second rest position thereof. During this movement of the pallet assembly, the magnet 30 moves radially and changes from a superposed state on the magnetised portion 38A, corresponding to a high magnetic potential energy state, to a non-superposed state on this magnetised portion corresponding to a low magnetic potential energy state; which generates a magnetic force impulse applied to the magnetic pallet-stone (magnet 30) and thus the pallet assembly is subject to a force torque, such that the pallet assembly acts as a driver for the magnetic resonator. FIG. 2C shows the pallet assembly in the second rest position thereof just after a tipping. The escapement wheel 16A then rotates by one step in the negative direction and the magnet 32 climbs an increasing gradient of magnetic potential energy (magnetised portion 38A) thanks to the force torque supplied to the escapement wheel.

FIG. 2D shows a first shock between a tooth 42 and the mechanical pallet-stone 29 after the escapement 12A, formed of the pallet assembly 14 and the escapement wheel 16A, has climbed an increasing gradient of magnetic potential energy. FIG. 2E shows a rebound of the escapement wheel after the first shock of a tooth 42 on the mechanical pallet-stone 29 represented in the preceding figure. Finally, FIG. 2F shows a stage corresponding to that of FIG. 2A but with the pallet assembly 14 stopped in the second rest position thereof.

The invention claimed is:

1. A horological movement comprising a mechanical resonator and an escapement which is associated with said mechanical resonator, the escapement comprising an escapement wheel and a pallet assembly separate from the mechanical resonator and of which the axis of rotation is different from that of the mechanical resonator; the mechanical resonator being coupled with the pallet assembly such that, when said mechanical resonator has an oscillation, the pallet assembly is subject to an alternating movement between two rest positions wherein the pallet assembly remains alternately during successive time intervals; the pallet assembly comprising at least one magnetic pallet-stone formed of a magnet and the escapement wheel comprising a periodic magnetised structure which defines a plurality of increasing gradients of magnetic potential energy for said magnetic pallet-stone, each of these increasing gradients of magnetic potential energy being configured such that said magnetic pallet-stone can climb it when the pallet assembly is in a corresponding rest position of the two rest positions and that a force torque supplied to the escapement wheel corresponds to a normal operation of the horological movement, said force torque being equal to a nominal force torque or within a range of values which is selected for the normal operation of the horological movement, said magnetic pallet and the periodic magnetised structure being arranged such that the pallet assembly is subject to a magnetic force impulse in the direction of the alternating movement thereof, after said magnetic pallet-stone has climbed any one of said increasing gradients of magnetic potential energy, when the pallet assembly tips from one of the two rest positions having enabled said magnetic pallet-stone to climb said any one increasing gradient of magnetic potential energy to the other rest position;

wherein the pallet assembly comprises at least one mechanical banking and the escapement wheel comprises protruding parts; and wherein the pallet assembly and the escapement wheel are arranged such that, when said force torque is equal to said nominal force torque or has a value within at least an upper part of said value range and when the pallet assembly has said alternating movement, one of said protruding parts of the escapement wheel is subjected to at least one shock on a mechanical banking of said at least one mechanical banking after said magnetic pallet-stone has climbed any one of said increasing gradients of magnetic potential energy following a tipping of the pallet assembly in the rest position enabling said magnetic pallet-stone to climb said any gradient of magnetic potential energy, said at least one shock occurring so as to dissipate at least partially a kinetic energy of the escapement wheel acquired following said tipping.

2. The horological movement according to claim 1, wherein said shock is partially elastic such that the escapement wheel has a rebound following said shock.

3. The horological movement according to claim 1, wherein the pallet assembly and the escapement wheel are arranged such that, during said normal operation of the horological movement, one of said protruding parts of the escapement wheel is subjected to said at least one shock on said mechanical banking of the pallet assembly after said magnetic pallet-stone has climbed any one of said increasing gradients of magnetic potential energy following a tipping of the pallet assembly in the rest position enabling the magnetic pallet-stone to climb said any gradient of magnetic potential energy; and wherein the escapement is arranged such that the escapement wheel is immobilised momentarily in an angular stopping position following said shock and before a subsequent tipping of the pallet assembly, said protruding part pressing against the mechanical banking once the escapement wheel has momentarily stopped in the angular stopping position.

4. The horological movement according to claim 1, wherein the periodic magnetised structure furthermore defines for the magnetic pallet-stone magnetic barriers located respectively after the increasing gradients of magnetic potential energy, each of these magnetic barriers being arranged so as to exert a magnetic force torque on the escapement wheel, having an opposite direction to that of said force torque supplied to said escapement wheel, when the escapement wheel is in an angular equilibrium position of the forces exerted thereon while the magnetic pallet-stone is located at the magnetic potential energy gradient preceding the magnetic barrier in question, said magnetic force torque being greater than a maximum magnetic force torque induced by the magnetic potential energy gradient preceding the magnetic barrier in question before the escapement wheel reaches said angular equilibrium position of the forces.

5. The horological movement according to claim 4, wherein the escapement is arranged such that, following said shock and before a subsequent tipping of the pallet assembly, the escapement wheel is momentarily immobilised in an angular stopping position which is said angular equilibrium position of the forces.

6. The horological movement according to claim 5, wherein, once the escapement wheel has momentarily stopped in the angular stopping position, said protruding part subjected to said shock presses against said mechanical banking when the force torque supplied to the escapement wheel is equal to the nominal force torque or has a value within at least an upper zone of said upper part of said range of values.

7. The horological movement according to claim 5, wherein, during said normal operation and once the escapement wheel has momentarily stopped in the angular stopping position, said protruding part subjected to said shock presses against said mechanical banking.

8. The horological movement according to claim 5, wherein, during said normal operation and once the escapement wheel has momentarily stopped in the angular stopping position, said protruding part subjected to said shock is located at a distance from said mechanical banking, said angular stopping position corresponding substantially to an equilibrium position between said magnetic force torque and said force torque supplied to the escapement wheel.

9. The horological movement according to claim 1, wherein said magnetic pallet-stone is a first magnetic pallet-stone and said at least one mechanical banking is a first mechanical banking associated with the first magnetic pallet-stone: wherein the pallet assembly comprises a second magnetic pallet-stone and a second mechanical banking associated with said second magnetic pallet-stone, said periodic magnetised structure and the pallet assembly being arranged such that said plurality of increasing gradients of magnetic potential energy are also defined for the second magnetic pallet-stone, these increasing gradients being capable of being climbed, when the force torque supplied to the escapement wheel is equal to said nominal force torque in said range of values selected for said normal operation of the horological movement, successively by each of the first and second magnetic pallet-stones, when the pallet assembly is periodically in a first rest position, respectively in a second rest position of said two rest positions, and alternately by these first and second magnetic pallet-stones during the alternating movement of the pallet assembly; in that said second magnetic pallet-stone and the plurality of increasing gradients of magnetic potential energy are arranged such that the pallet assembly is subject to a second magnetic force impulse in the direction of the movement thereof, after the second magnetic pallet-stone has climbed any one of said increasing gradients of magnetic potential energy, when the pallet assembly tips from the second rest position to the first rest position; in that each increasing gradient of said plurality of increasing gradients of magnetic potential energy is associated with a different protruding part of said protruding parts; and wherein the pallet assembly and the escapement wheel are arranged such that, when the pallet assembly exhibits said alternating movement and said force torque is equal to said nominal force torque or within said at least an upper part of said range of values and after the first or second magnetic pallet-stone has climbed any one of said increasing gradients of magnetic potential energy following the tipping of the pallet assembly in the first or second corresponding rest position, the protruding part of the escapement wheel associated with said any one of said increasing gradients of magnetic potential energy is subject to said at least one shock on said first or second mechanical banking of the pallet assembly, said shock occurring so as to dissipate at least partially the kinetic energy of the escapement wheel following said tipping.

10. The horological movement according to claim 9, wherein the periodic magnetised structure is arranged such that the outer rim thereof is substantially circular, parts in the form of an arc of a circle of said magnetised structure, which respectively define said magnetic potential energy gradients, being arranged circularly around an axis of rotation of the escapement wheel.

11. The horological movement according to claim 9, wherein said protruding parts are formed by teeth which extend in a general plane wherein the first and second mechanical bankings which are formed respectively by two magnetic pallet-stones of the pallet assembly respectively supporting said magnet and another magnet, forming the second magnetic pallet-stone, which are also located in the general plane, also extend.

12. The horological movement according to claim 9, wherein the periodic magnetised structure furthermore defines for the magnetic pallet-stone magnetic barriers located respectively after the increasing gradients of magnetic potential energy, each of these magnetic barriers being arranged so as to exert a magnetic force torque on the escapement wheel, having an opposite direction to that of said force torque supplied to said escapement wheel, when the escapement wheel is in an angular equilibrium position of the forces exerted thereon while the magnetic pallet-stone is located at the magnetic potential energy gradient preceding the magnetic barrier in question, said magnetic force torque being greater than a maximum magnetic force torque induced by the magnetic potential energy gradient preceding the magnetic barrier in question before the escapement wheel reaches said angular equilibrium position of the forces.

13. The horological movement according to claim 12, wherein said magnetic barriers are also provided for the second magnetic pallet-stone, each of these magnetic barriers being arranged so as to exert a magnetic force torque on the escapement wheel, having an opposite direction to that of said force torque supplied to said escapement wheel, when the escapement wheel is in an angular equilibrium position of the forces exerted thereon while the second magnetic pallet-stone is located at the magnetic potential energy gradient preceding said magnetic barrier; and wherein the escapement is arranged such that, following said at least one shock on said second mechanical banking and before a subsequent tipping of the pallet assembly, the escapement wheel is immobilised in an angular stopping position.

* * * * *